(12) United States Patent
Kohli et al.

(10) Patent No.: US 7,456,120 B2
(45) Date of Patent: Nov. 25, 2008

(54) BAG FILTER COMPRISING META-ARAMID AND ACRYLIC FIBER

(75) Inventors: Anil Kohli, Midlothian, VA (US); Herman Hans Forsten, Williamsburg, VA (US); Kurt Hans Wyss, Chavannes de Bogis (CH)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/520,370

(22) Filed: Sep. 13, 2006

(65) Prior Publication Data

US 2008/0105124 A1    May 8, 2008

(51) Int. Cl.
*D04H 1/00* (2006.01)
*D04H 13/00* (2006.01)
*D04H 3/00* (2006.01)
*D04H 5/00* (2006.01)

(52) U.S. Cl. .................. 442/415; 428/902; 428/920; 428/921; 442/402; 442/408; 442/414

(58) Field of Classification Search .............. 442/402, 442/408, 415, 414; 428/902, 920, 921
See application file for complete search history.

(56) References Cited

U.S. PATENT DOCUMENTS

| 2,910,763 | A |  | 11/1959 | Lauterbach |  |
|---|---|---|---|---|---|
| 3,047,455 | A |  | 7/1962 | Holmes et al. |  |
| 3,063,966 | A |  | 11/1962 | Kwolek et al. |  |
| 3,227,793 | A |  | 1/1966 | Cipriani |  |
| 3,287,324 | A |  | 11/1966 | Sweeny |  |
| 3,414,645 | A |  | 12/1968 | Morgan, Jr. |  |
| 3,508,308 | A |  | 4/1970 | Bunting, Jr. et al. |  |
| 3,524,304 | A |  | 8/1970 | Wittemeier et al. |  |
| 3,684,284 | A |  | 8/1972 | Tranfield |  |
| 3,797,074 | A |  | 3/1974 | Zafiroglu |  |
| 4,056,374 | A |  | 11/1977 | Hixenbaugh |  |
| 4,100,323 | A |  | 7/1978 | Forsten |  |
| 4,117,578 | A |  | 10/1978 | Forsten |  |
| 4,310,336 | A |  | 1/1982 | Peterson |  |
| 4,481,022 | A |  | 11/1984 | Reier |  |
| 4,490,253 | A |  | 12/1984 | Tafara |  |
| 4,585,833 | A |  | 4/1986 | Domeier |  |
| 4,765,812 | A | * | 8/1988 | Homonoff et al. | ............ 55/524 |
| 5,667,743 | A |  | 9/1997 | Tai et al. |  |
| 6,103,643 | A | * | 8/2000 | Forsten | ........................ 442/103 |
| 6,808,548 | B2 | * | 10/2004 | Wilkins et al. | ................. 55/528 |
| 2003/0192294 | A1 | * | 10/2003 | Smithies | ........................ 55/521 |
| 2004/0144716 | A1 | * | 7/2004 | Kobayashi et al. | ........... 210/508 |

* cited by examiner

*Primary Examiner*—Norca Torres-Velazquez

(57) ABSTRACT

This invention relates to a bag filter having a tubular section, one closed end and one open end, the tubular section having a nonwoven felt comprising an intimate fiber blend of 50 to 80 parts by weight meta-aramid fiber and 20 to 50 parts by weight acrylic fiber, based on the total weight of meta-aramid and acrylic fibers in the felt, wherein the acrylic fiber has an equal or lower denier per filament than the meta-aramid fiber.

11 Claims, 1 Drawing Sheet

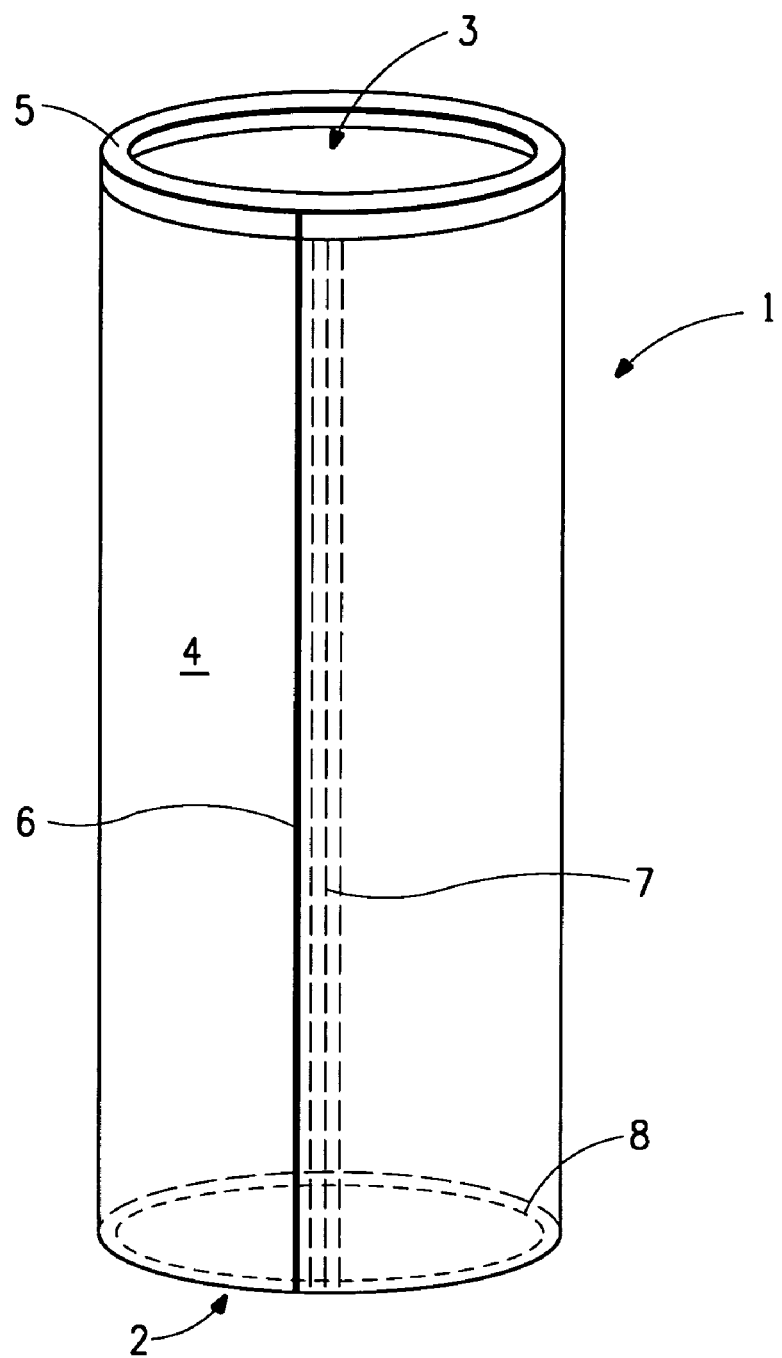
FIGURE

BAG FILTER COMPRISING META-ARAMID AND ACRYLIC FIBER

BACKGROUND OF THE INVENTION

1. Field of the Invention

This invention relates to bag filters having enhanced filtration performance. Such bag filters are particularly useful in filtering hot gases, for example gases at temperatures of 150° C. or even higher. In one embodiment, the bag filters are particularly useful in asphalt plants to meet emission standards.

2. Description of Related Art

Meta-aramid bag filters for hot gas filtration such as disclosed in U.S. Pat. No. 4,100,323 to Forsten are known and are used to protect the environment from particulate matter from asphalt plants, coal plants, and other industrial concerns. Due to the high potential environmental impact from such plants, any improvement that has the potential to improve the capture of particulate material per unit weight of bag filter is desired.

BRIEF SUMMARY OF THE INVENTION

This invention relates to a bag filter having a tubular section, one closed end and one open end, the tubular section having a nonwoven felt comprising an intimate fiber blend of 50 to 80 parts by weight meta-aramid fiber and 20 to 50 parts by weight acrylic fiber, based on the total weight of meta-aramid and acrylic fibers in the felt, wherein the acrylic fiber has an equal or lower denier per filament than the meta-aramid fiber.

BRIEF DESCRIPTION OF THE DRAWINGS

The FIGURE illustrates one embodiment of the bag filter of this invention.

DETAILED DESCRIPTION OF THE INVENTION

This invention relates to a bag filter made from an intimate fiber blend of 50 to 80 parts by weight meta-aramid fiber and 20 to 50 parts by weight acrylic fiber wherein the acrylic fiber has an equal or lower denier per filament than the meta-aramid fiber. Surprisingly the inventors have found that acrylic fibers, which are generally thought to not be suitable for use in hot gas environments, can improve filtration performance of bag filters. It is believed the acrylic fibers work with the meta-aramid fibers in a bag filter to retain more particulates without adversely affecting the filter bag mechanical properties. The FIGURE illustrates one embodiment of the filter bag of this invention. Filter bag 1 has a closed end 2, an open end 3, and a tubular section 4. In the embodiment represented, the filter bag also has a spring steel metal snap ring 5 attached to the open end of the bag. The tubular section 4 of this bag is comprised of a filtration felt that is overlapped, forming a seam 6 sewn with triple stitching 7. The closed end of the bag in this embodiment is also comprised of a filtration felt that is stitched at 8 to the end of the felt used for the tubular section. While the FIGURE represents a preferred embodiment, other potential constructions, orientations, and features of bag filters may be used, such as those disclosed in U.S. Pat. No. 3,524,304 to Wittemeier et al.; U.S. Pat. No. 4,056,374 to Hixenbaugh; U.S. Pat. No. 4,310,336 to Peterson; U.S. Pat. No. 4,481,022 to Reier; U.S. Pat. No. 4,490,253 to Tafara; and/or U.S. Pat. No. 4,585,833 to Tafara.

In some embodiments the closed end 2 of the filter bag, as shown in the FIGURE, is a disk of filter material sewn to the tubular section. In some other embodiments the closed end can be made of some other material, for example in some situations a metallic closed end might be needed. In other embodiments the closed end can be ultrasonically, adhesively, or heat seamed or sealed in some other manner than sewing. In another embodiment the felt used in the tubular section of the bag can be gathered together or folded, and then sealed, to form the closed end.

In some embodiments the open end 3 of the bag may be provided with hardware to attach the bag to the cell plate. In some other embodiments the open end of the bag may be sized such that a snug fit is accomplished by sliding the bag over a specially designed cell plate.

In some embodiments of this invention the filtration material used in the tubular section 4 and optionally in the closed end 2 is a nonwoven fabric or felt. The nonwoven fabric or felt can be made by conventional nonwoven sheet forming processes, including processes for making air-laid nonwovens, wet-laid nonwovens, or nonwovens made from carding equipment; and such formed sheets can be consolidated into fabrics via spunlacing, hydrolacing, needlepunching, or other processes which can generate a nonwoven sheet. The spunlaced processes disclosed in U.S. Pat. No. 3,508,308 and U.S. Pat. No.3,797,074; and the needlepunching processes disclosed in U.S. Pat. No. 2,910,763 and U.S. Pat. No. 3,684,284 are examples of conventional methods well known in the art that are useful in the manufacture of the nonwoven fabrics and felt.

In some preferred embodiments, the nonwoven felt is a needledpunched felt. In some other preferred embodiments, the nonwoven felt is a spunlaced felt. The basis weight of the felt is typically about 8 to 16 ounces per square yard, and in a preferred embodiment is 12 to 14 ounces per square yard.

In some embodiments the tubular section 4 and optionally in the closed end 2 of the filter bag of this invention is a single layer of filtration material. In some other embodiments, the tubular section is made of a filtration material supported by a scrim or reinforcing cloth that provides stability during pulsing of the bag. In some preferred embodiments, the nonwoven felt includes a supporting woven scrim that is made with fibers that are compatible with the staple fibers in the felt. One type of this felt can be made using standard carding and cross lapping equipment to convert staple fibers into crosslapped batts having basis weights of about 4 to 8 ounces per square yard (135 to 270 grams per square meter) preferably about 6 ounces per square yard (200 grams per square meter). If desired the batts can then be tacked or lightly consolidated, for example, on a standard needle punch machine. Two or more of these batts can then be positioned on either side of a woven scrim having a basis weight of about 1 to 4 ounces per square yard (34 to 135 grams per square meter) preferably about 2 ounces per square yard (70 grams per square meter), and the three layers are needled punched several times on both sides to produce filtration felts. In some preferred embodiments, the woven scrim comprises polyphenylene sulfide fibers, meta-aramid fibers, or mixtures thereof.

In a preferred embodiment shown in the FIGURE, the filtration material is overlapped to form a cylinder of filter material having a seam 6 that is then stitched with a high temperature thread, such as a thread having 3 to 6 strand plies of meta-aramid fiber, fluoropolymer fiber, glass fiber, or combinations or blends thereof. In other embodiments, the overlapped seam can be sealed by ultrasonics, adhesives, heat, or some combination of all these seaming methods.

One feature of the bag filter of this invention is that it includes a nonwoven felt comprising an intimate fiber blend of 50 to 80 parts by weight meta-aramid fiber and 20 to 50 parts by weight acrylic fiber, based on the total weight of meta-aramid and acrylic fibers in the felt. In a preferred embodiment, the intimate fiber blend comprises 65 to 75 parts by weight meta-aramid fiber. In another preferred embodiment, the intimate fiber comprises 25 to 35 parts by weight acrylic fiber. The fibers are dispersed in the felt as an intimate blend, meaning that the meta-aramid and acrylic fibers are uniformly mixed and distributed in the felt. This forms a uniform mixture in the felt so as to avoid hot spots or localized areas caused by having a high concentration of the acrylic fiber in any one portion of the felt.

The intimate fiber blend can be formed by conventional methods. For example, in one embodiment clumps of crimped staple fibers obtained from bales of fiber can be opened by a device such as a picker and then blended by any available method, such as air conveying, to form a more uniform mixture. In an alternative embodiment, the fibers can be blended to form a uniform mixture prior to fiber opening in the picker. In still another possible embodiment the fibers may be cutter blended, that is, tows of the various fiber types can be combined and then cut into staple. The blend of fibers can then be converted into a nonwoven fabric or felt using conventional methods as mentioned previously. Generally this involves forming a fibrous web by use of a device such as a card, although other methods, such as air-laying or wet-laying of the fibers may be used. If desired, the fibrous web can then be sent via conveyor to a device such as a crosslapper to create a crosslapped structure by layering individual webs on top of one another in a zigzag structure.

Another feature of the bag filter of this invention is that the acrylic fiber has an equal or lower denier per filament, or linear density per filament, than the meta-aramid fiber to enhance particle retention in the felt and improve bag filter performance. In some embodiments, the meta-aramid fiber has a linear density of from about 1 to 5 denier per filament (1.1 to 5.5 decitex per filament) and the acrylic fiber has a linear density of from about 0.5 to 3 denier per filament (0.6 to 3.3 decitex per filament). In one preferred embodiment, the linear density of the meta-aramid fiber is greater than 1.8 denier per filament (2.0 decitex per filament) up to about 2.2 denier per filament (2.4 decitex per filament) and the acrylic fiber has a linear density of from about 0.9 denier per filament (1.0 decitex per filament) up to 1.8 denier per filament (2.0 decitex per filament). The fibers used in this invention preferably have a cut length of about 1.5 to 3 inches (38 to 76 mm) and are crimped, having a crimp frequency of about 4 to 10 crimps per inch (1.5 to 4 crimps per centimeter).

Acrylic polymer has a lower specific gravity (about 1.16) than meta-aramid polymer (about 1.38), meaning that for fibers having equal deniers, the filament diameter of an acrylic fiber will be larger than the filament diameter of a meta-aramid fiber and per unit weight the surface area of the acrylic fiber is larger than the meta-aramid fiber. Therefore, when a bag filter made from a felt of acrylic fiber and the meta-aramid fiber having the same filament denier is compared with a bag filter from a felt of solely meta-aramid fiber of the same filament denier, the bags will have identical unit weight; however, the acrylic/meta-aramid bag filter will have more fiber surface area which can capture particles. When the acrylic fiber has a lower filament denier than the meta-aramid fiber, more acrylic fibers can be incorporated into the bag filter per unit weight, again resulting in improved filtration performance due to improved surface coverage by the increased number of filaments. On the other hand, if the filament denier of the acrylic fiber is appreciably larger than the filament denier of the meta-aramid fiber, the acrylic fiber has higher surface area, but on a per unit weight basis, fewer acrylic fibers must be used, resulting in a bag filter that is believed to have poorer filtration efficiency.

The acrylic fiber useful in this invention includes acrylonitrile units which are at least 85 wt % of the total acrylic fiber. An acrylonitrile unit is —(CH2-CHCN)—. The acrylic fiber can be made from acrylic polymers made up of 85% by weight or more of acrylonitrile with 15% by weight or less of an ethylenic monomer copolymerizable with acrylonitrile and mixtures of two or more of these acrylic polymers. Examples of the ethylenic monomer copolymerizable with acylonitrile include acrylic acid, methacrylic acid and esters thereof (methyl acrylate, ethyl acrylate, methyl methacylate, ethyl methacrylate, etc.), vinyl acetate, vinyl chloride, vinylidene chloride, acrylamide, methacylamide, methacrylonitrile, allylsulfonic acid, methanesulfonic acid and styrenesulfonic acid. One illustrative method of making acrylic polymers and fibers is disclosed in U.S. Pat. No. 3,047,455. Acrylic fibers have been commercially manufactured by a number of companies including Solutia, Inc. and Bayer Inc.; one particularly preferred acrylic fiber is commercially available from Sterling Fibers, Inc. of Pace, Fla.

The meta-aramid fiber useful in this invention includes meta-oriented synthetic aromatic polyamides. The polymers must be of fiber-forming molecular weight in order to be shaped into fibers. The polymers can include polyamide homopolymers, copolymers, and mixtures thereof which are predominantly aromatic, wherein at least 85% of the amide (—CONH—) linkages are attached directly to two aromatic rings. The rings can be unsubstituted or substituted. The polymers are meta-aramid when the two rings or radicals are meta oriented with respect to each other along the molecular chain. Preferably copolymers have no more than 10 percent of other diamines substituted for a primary diamine used in forming the polymer or no more than 10 percent of other diacid chlorides substituted for a primary diacid chloride used in forming the polymer. Additives can be used with the aramid; and it has been found that up to as much as 13 percent by weight of other polymeric material can be blended or bonded with the aramid. The preferred meta-aramids are poly(meta-phenylene isophthalamide)(MPD-I) and its copolymers. One such meta-aramid fiber is Nomex® aramid fiber available from E. I. du Pont de Nemours and Company of Wilmington, Del., however, meta-aramid fibers are available in various styles under the trademarks Tejinconex®, available from Teijin Ltd. of Tokyo, Japan; New Star® Meta-aramid, available from Yantai Spandex Co. Ltd, of Shandong Province, China; and Chinfunex® Aramid 1313 available from Guangdong Charming Chemical Co. Ltd., of Xinhui in Guangdong, China. Meta-aramid fibers are inherently flame resistant and can be spun by dry or wet spinning using any number of processes; however, U.S. Pat. Nos. 3,063,966; 3,227,793; 3,287,324; 3,414,645; and 5,667,743 are illustrative of useful methods for making aramid fibers that could be used in this invention.

TEST METHODS

Filtration efficiency was measured using ASTM D 6830; mullen burst was measured using ASTM D 461; and breaking strength and elongation were measured using ASTM D 5035.

EXAMPLE 1

An intimate fiber blend containing 67 parts by weight of a 2 denier per filament (2.2 decitex per filament) meta-aramid fiber having a 2 inch (50 mm) cut length (available under the trademark Nomex® fiber from E. I. du Pont de Nemours and Company, Wilmington Del.) and 33 parts by weight of a 0.9 denier per filament (1.0 decitex per filament) acrylic fiber having a 2 inch (50 mm) cut length available from Sterling Fibers, Inc., was made by combining and mixing the staple fibers from bales. Using standard carding and cross lapping equipment these fibers were converted into crosslapped batts having a basis weight of approximately 6 ounces per square yard (200 grams per square meter) that were then tacked or lightly consolidated on a standard needle punch machine. Two of these batts were positioned on either side of a woven scrim having a basis weight of approximately 2 ounces per square yard (70 grams per square meter) and consisting entirely of Nomex® meta-aramid spun yarns, and the three layers were needled punched several times on both sides to produce a nominal 14 ounce per square yard (475 grams per square meter) filtration felt. As a comparison, a 100 percent meta-aramid felt was made. Using the same procedure as above, a three-layered felt containing two batts of 100 percent 2 denier per filament (2.2 decitex per filament) Nomex® meta-aramid fiber, one positioned on either side of the same 2 ounce per square yard (70 grams per square meter) woven meta-aramid spun yarn scrim, was made. Both felts were evaluated for filtration efficiency using the procedure ASTM D 6830 and the performance of the filtration felt made from the intimate blend was well below the emission limits for an asphalt plant. In addition, the performance of the filtration felt made from the blend was also superior to the 100% meta-aramid structure, as shown in Table 1.

TABLE 1

| Property | Comparison (100% aramid) | This Invention (67/33% aramid/acrylic) |
|---|---|---|
| Mean outlet particle concentration total (gr/dscf) | $1.68 \times 10^{-4}$ | $1.25 \times 10^{-4}$ |

EXAMPLE 2

The felts of Example 1 were fabricated into filter bags that were approximately 120 inches (305 cm) long having a 7.5 inch (19 cm) double flat width and a 5 inch (13 cm) snap ring top. The bag had triple-stitching at the seams. The bags then filtered asphalt plant dust particles in a pulse-jet bag house; after about 4 months of operation, the bags were removed and the bags showed no visible signs of potential bag failures like holes, tears, or abrasion. Physical testing was then conducted on the bag material and the results are reported in Table 2. Surprisingly, the addition of a lower temperature acrylic fiber had no adverse effect on the tensile performance of the bag material.

TABLE 2

| Property | 100% Aramid | 67/33% Aramid/Acrylic |
|---|---|---|
| Tensile Strength (lbs/inch) | 70.5 | 73 |
| Elongation (%) | 54 | 65 |
| Mullen Burst (psi) | 436 | 474 |

What is claimed is
1. A bag filter having a tubular section, one closed end and one open end, the tubular section having a nonwoven felt comprising an intimate fiber blend of
 a) 50 to 80 parts by weight meta-aramid fiber, and
 b) 20 to 50 part by weight acrylic fiber, based on the total weight of meta-aramid and acrylic fibers in the felt,
 wherein the acrylic fiber has an equal or lower denier per filament than the meta-aramid fiber; and,
 wherein the bag filter is capable of filtering a hot gas at a temperature of at least 150 degrees centigrade.
2. The bag filter of claim 1 comprising 65 to 75 parts by weight meta-aramid fiber.
3. The bag filter of claim 1 comprising 25 to 35 parts by weight acrylic fiber.
4. The bag filter of claim 1 wherein the nonwoven felt is a needlepunched felt.
5. The bag filter of claim 1 wherein the nonwoven felt is a spunlaced felt.
6. The bag filter of claim 1 wherein the denier per filament of the meta-aramid fiber is from 1 to 5.
7. The bag filter of claim 1 wherein the denier per filament of the acrylic fiber is 0.5 to 3.
8. The bag filter of claim 1 wherein the closed end also comprises the intimate fiber blend.
9. The bag filter of claim 1 wherein the basis weight of the felt is from 8 to 16 ounces per square yard.
10. The bag filter of claim 9 wherein the basis weight of the felt is from 12 to 14 ounces per square yard.
11. A process of filtering a hot gas comprising passing a gas heated to a temperature of at least 150 degrees C. through a bag filter
 having a tubular section, one closed end and one open end, the tubular section having a nonwoven felt comprising an intimate fiber blend of
 a) 50 to 80 parts by weight meta-aramid fiber, and
 b) 20 to 50 part by weight acrylic fiber, based on the total weight of meta-aramid and acrylic fibers in the felt,
 wherein the acrylic fiber has an equal or lower denier per filament than the meta-aramid fiber, and
 wherein the bag filter is capable of filtering a hot gas at a temperature of at least 150 degrees centigrade.

* * * * *